United States Patent
Prabhakar et al.

(10) Patent No.: US 12,490,074 B2
(45) Date of Patent: Dec. 2, 2025

(54) SELECTION OF SLICE-SUPPORTING PLMNs WHILE ROAMING AWAY FROM HOME NETWORK

(71) Applicant: Apple Inc., Cupertino, CA (US)

(72) Inventors: Alosious Pradeep Prabhakar, Singapore (SG); Vijay Venkataraman, San Jose, CA (US); Rohit R. Matolia, Surat (IN); Krisztian Kiss, Hayward, CA (US); Srinivasan Nimmala, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/181,736

(22) Filed: Feb. 22, 2021

(65) Prior Publication Data
US 2021/0297844 A1    Sep. 23, 2021

(30) Foreign Application Priority Data

Mar. 17, 2020  (IN) .............................. 202041011532

(51) Int. Cl.
*H04W 8/12*     (2009.01)
*H04W 48/18*    (2009.01)
(Continued)

(52) U.S. Cl.
CPC .............. *H04W 8/12* (2013.01); *H04W 48/18* (2013.01); *H04W 60/04* (2013.01); *H04W 84/042* (2013.01)

(58) Field of Classification Search
CPC ..... H04W 48/14; H04W 48/16; H04W 48/18; H04W 60/04; H04W 8/12; H04W 84/042
See application file for complete search history.

(56) References Cited

U.S. PATENT DOCUMENTS

| | | | |
|---|---|---|---|
| 2012/0157061 A1* | 6/2012 | Livyatan ............... | H04M 15/00 455/413 |
| 2018/0270877 A1* | 9/2018 | Lee ........................ | H04W 36/00 |

(Continued)

FOREIGN PATENT DOCUMENTS

| | | |
|---|---|---|
| CN | 110324813 | 10/2019 |
| CN | 110691384 | 1/2020 |

(Continued)

OTHER PUBLICATIONS

International Search Report and Written Opinion for PCT/US2021/021867, mailed Jun. 16, 2021, 17 pages.

(Continued)

*Primary Examiner* — Charles N Appiah
*Assistant Examiner* — Nicole M Louis-Fils
(74) *Attorney, Agent, or Firm* — Kowert, Hood, Munyon, Rankin & Goetzel, P.C.

(57) ABSTRACT

A user equipment (UE) may receive a list of Public Land Mobile Networks (PLMNs) that support a given network slice in a given country, different from a home country of a home PLMN of the UE. When roaming in the given country, UE may access a PLMN of the list if the given network slice is desired. The list may be provided by the home PLMN: while the UE is in the home country; or via a visited PLMN while the UE is in the given country. The list may be received in response to a UE-initiated request, or pushed to the UE by the home PLMN. A validity timer period received (Continued)

with the list may indicate a duration of validity of the list. In an alternative scenario, the UE may receive the list from an entitlement server, e.g., one belonging to a visited PLMN.

17 Claims, 11 Drawing Sheets

(51) Int. Cl.
*H04W 60/04* (2009.01)
*H04W 84/04* (2009.01)

(56) References Cited

U.S. PATENT DOCUMENTS

| | | | |
|---|---|---|---|
| 2019/0029065 A1* | 1/2019 | Park | H04W 48/02 |
| 2019/0053148 A1 | 2/2019 | Lee | |
| 2019/0261157 A1 | 8/2019 | Ramle | |
| 2019/0261185 A1* | 8/2019 | Velev | H04W 48/18 |
| 2019/0357128 A1 | 11/2019 | Casati | |
| 2020/0015066 A1* | 1/2020 | Zhu | H04W 8/18 |
| 2020/0137576 A1* | 4/2020 | Hu | H04W 48/18 |
| 2020/0163008 A1* | 5/2020 | Hedman | H04W 48/18 |
| 2020/0260384 A1* | 8/2020 | Ryu | H04W 76/27 |
| 2021/0282003 A1* | 9/2021 | Li | H04W 76/25 |
| 2022/0053416 A1* | 2/2022 | Salkintzis | H04W 76/10 |
| 2022/0151004 A1* | 5/2022 | Sedlacek | H04W 8/082 |
| 2023/0043081 A1* | 2/2023 | Jeong | H04W 8/02 |

FOREIGN PATENT DOCUMENTS

| | | |
|---|---|---|
| JP | 2017521978 | 8/2017 |
| KR | 10-20190039260 | 4/2019 |
| WO | 2019024816 | 2/2019 |

OTHER PUBLICATIONS

Nokia et al., "KI: Area of service: impact on PLMN selection in roaming", SA WG2 Meeting #136-AH, S2-2001468, Incheon, Korea, Jan. 13, 2020, 2 pages.
"3rd Generation Partnership Projected; Technical Specification Group Services and System Aspects; System Architecture for the 5G System; Stage 2 (Release 15)", 3GPP TS 23.501 V15.3.0, Sep. 2018, 226 pages.
SA2 "draft LS on GSMA NG.116 Attribute Area of service and impact on PLMN selection", 3GPP TSG-SA WG2 Meeting #136-AH, S2-2000874, Incheon, Korea, Jan. 13, 2020.
Sharp, "Clarification on Configured S-NSSAI not associated with a PLMN_Alt3", 3GPP TSG-CT WG1 Meeting 112bis, C1-186415, Vilnius, Lithuania, Oct. 15, 2018, 24 pages.
Nokia et al., "Update to section 8.1. Interim Agreements", SA WG2 Meeting #S2-118, S2-167227Neno, Nevada, USA, Nov. 14, 2016, 6 pages.
Office Action for JP Patent Application No. 2022-555645; Sep. 14, 2023.
Apple "KI #8, New Sol: Including supported PLMN list in Allowed NSSAI"; SA WG2 Meeting #139E S2-2003735; Jun. 1, 2020.
Office Action for EP Patent Application No. 21715729.6; Aug. 13, 2024.
Notice of Allowance for KR 10-2022-7031795; Jun. 25, 2025.
Office Action for CN 2021800210953; Jun. 30, 2025.
Office Action for CN 202180021095.3; Dec. 20, 2024.

* cited by examiner

Length of S-NSSAI Contents (octet 2)

Bits
| 8 | 7 | 6 | 5 | 4 | 3 | 2 | 1 | |
|---|---|---|---|---|---|---|---|---|
| 0 | 0 | 0 | 0 | 0 | 0 | 0 | 1 | SST |
| 0 | 0 | 0 | 0 | 0 | 0 | 1 | 0 | SST and mapped HPLMN SST |
| 0 | 0 | 0 | 0 | 0 | 1 | 0 | 0 | SST and SD |
| 0 | 0 | 0 | 0 | 0 | 1 | 0 | 1 | SST, SD and mapped HPLMN SST |
| 0 | 0 | 0 | 0 | 1 | 0 | 0 | 0 | SST, SD, mapped HPLMN SST and mapped HPLMN SD |

```
┌─────────────────────────────────────────────────────────┐
│ receive a list of one or more Public Land Mobile Networks (PLMNs) │
│ that support a given network slice in a given country, where the given │
│ country is different from a home country of a home PLMN of the UE, │
│ wherein the given network slice is supported in the home PLMN │
│                          1210                           │
└─────────────────────────────────────────────────────────┘
                            │
                            ▼
┌─────────────────────────────────────────────────────────┐
│ in response to determining that the UE is located in the given country │
│ and that access to the given network slice is desired, access (or │
│ prioritize access to) a PLMN of said list, to use the given network │
│                      slice   1215                       │
└─────────────────────────────────────────────────────────┘
```

*FIG. 12*

Method for operating an Access & Mobility Management Function (AMF) of a Home Public Land Mobile Network (PLMN) in a home country  1300 retrieve a list of one or more roaming Public Land Mobile Networks (PLMNs) that support a given network slice in a given country, wherein the given country is different from the home country  1310 send the list to a user equipment that is subscribed to the Home PLMN  1315

SELECTION OF SLICE-SUPPORTING PLMNs WHILE ROAMING AWAY FROM HOME NETWORK

PRIORITY CLAIM

This application claims benefit of priority to Indian Application No. 202041011532, titled "Improved Selection of Slice-Supporting PLMNs While Roaming Away from Home Network", filed Mar. 17, 2020, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communication, and more particularly, to mechanisms enabling a wireless device to perform improved selection of slice-supporting networks while roaming away from a home network.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

In order to perform cellular communication, a user equipment (UE) typically first selects and registers with a public land mobile network (PLMN), which will then provide cellular communication services to the UE. A PLMN is a land based network provided by a specific operator in a specific country. For example, a PLMN in a given country might support a combination of cellular technologies such as GSM/2G, UMTS/3G, and LTE/4G.

A PLMN may support multiple network slices, e.g., logical (or virtual) end-to-end networks. Each of the network slices may provide a different set of features and services. Different UEs may need or desire to access different network slices, or different sets of network slices. For example, a smart phone and a home utility meter may need to access different sets of network slices. Or a given UE may need to access different slice when reading email versus conducting a phone conversation. Each slice is uniquely identified by a corresponding S-NSSAI value. (S-NSSAI is an acronym for Single-Network Slice Selection Assistance Information.)

When a UE is camped on its Home PLMN, the UE may readily access any network slice supported by the Home PLMN. However, in roaming scenarios, successful selection and registration with a PLMN that supports a desired network slice can present a time- and power-consuming challenge because the UE may not be aware of which PLMNs in a foreign country will support that network slice. The UE may need to repeatedly attempt registration with different PLMNs until a suitable one is found. Accordingly, improvements in the field would be desirable.

One issue in relation to the provision of network slices in 3GPP 5G is how to deal with the impact of the so called "area of service" on PLMN selection while roaming away from a home PLMN. The home PLMN of a UE device is a PLMN to which the UE device (or a Subscriber Identity Module of the UE device) is subscribed.

One of the attributes in the Generic Network Slice Template (GST) as documented in GSMA 5GJA NG.116 is area of service. (GSM is an acronym for Global System for Mobile. GSMA is an acronym for GSM Association. 5GJA is an acronym for 5G Joint Activity. NG is an acronym for Network Group.) This attribute specifies the area where terminals (UE devices) can access a given network slice. In other words, this attribute specifies the list of the countries where the services defined by a given network slice will be provided. The list is specific to Network Slice Providers (NSPs) and their roaming agreements.

If the list includes more than one country, roaming agreements between the Home PLMN (HPLMN) and the Visited PLMNs (VPLMNs) are required.

If an S-NSSAI of the HPLMN can only be used with certain PLMNs in a country where the UE is roaming, then before the S-NSSAI of the HPLMN can be used, the UE should perform selection of one of these certain PLMNs. (The S-NSSAI may be interpreted as an identifier of a network slice. Thus, the present patent may refer to using an S-NSSAI as a shorthand for using the network slice identified by the S-NSSAI.) It is possible that preferred PLMNs in the visited country are not necessarily capable of providing all the possible network slices the HPLMN has promised to its customers. Furthermore, the PLMNs in the preferred list of PLMNs are not necessarily capable of providing ubiquitous 5GS coverage in the visited country. As a result, it is possible that the UE device may have to use non-preferred PLMNs in certain areas and not all of these PLMNs may support a network slice desired by the UE device subscribed with the HPLMN.

Today, the roaming UE device would have to select a priority PLMN either from Subscriber Identity Module (SIM) files or via internal prioritized PLMN list with no awareness as to whether the PLMN supports a desired S-NSSAI of the HPLMN, e.g., no awareness until (a) the S-NSSAI is indicated (e.g., in a registration accept message) as being allowed in the PLMN or (b) the configured NSSAI of the PLMN is provided. (An S-NSSAI may be "Allowed" much later than REGISTRATION procedure when the network slice is undergoing slice specific authentication and authorization. In such cases, the UE may be informed whether a slice is Allowed or Rejected, via a UE CONFIGURATION UPDATE COMMAND.) The UE device may need to make repeated registration attempts to discover a PLMN that supports the desired S-NSSAI, thus wasting time and power, and causing outage in roaming services to the end user.

SUMMARY

Various mechanisms are disclosed herein that allow a UE to perform S-NSSAI-aware PLMN selection.

In one set of embodiments, a method for operating a user equipment (UE) may include the following operations.

The method may include receiving a list of one or more Public Land Mobile Networks (PLMNs) that support a given network slice in a given country, wherein the given country is different from a home country of a home PLMN of the UE, wherein the given network slice is supported in the home PLMN.

The method may also include, in response to determining that the UE is located in the given country and that access to the given network slice is desired, accessing (or prioritizing access to) a PLMN of said list, e.g., to use the given network slice.

In some embodiments, the processing element may transmit a registration request (or other message) to the Home PLMN, e.g., while the UE is in the home county or in the given country, wherein the list is received from the Home PLMN after having transmitted the registration request.

In some embodiments, the registration request may include an identification of one or more roaming countries including the given country.

In some embodiments, while the UE is in the given country, the processing element may send to a roaming PLMN in the given country a registration request (or other message) including an identification of a second country different from home country and different from the given country. The roaming PLMN may contact the Home PLMN to obtain a list of one or more PLMNs that support the given network slice in the second country, and forward that list to the UE. The processing element may receive the list. This registration request (or other message) that includes the identification of the second country may be sent while the UE is in the given country, e.g., in anticipation of entering the second country in the future.

In some embodiments, the registration request may include one or more of the following: (a) a requested Single-Network Slice Selection Assistance Information (S-NSSAI) value associated with the given network slice, wherein the requested S-NSSAI value includes an information element indicating whether the list of one or more PLMNs is requested; and (b) an identification of one or more roaming countries including the given country.

In some embodiments, the list may be received along with a validity timer period indicating a length of time within which the list is guaranteed to be valid.

In some embodiments, the processing element may receive a validity timer period that indicates a period of time after which the one or more PLMNs of the list will no longer support the given slice.

In some embodiments, the processing element may receive the list: (a) when the UE is associated with (e.g., camped on, or connected to) the Home PLMN in the home country; and (b) without any request asserted by the UE for the list.

In some embodiments, the processing element may receive the list from the Home PLMN via: (a) a visited PLMN of the given country, or (b) a WiFi access point in the given country, or (c) satellite based Internet connectivity in the given country.

In some embodiments, the processing element may send a fetch request to an entitlement server while roaming in the given country, wherein the fetch request includes an indication of the UE's location and an identification of the given network slice, wherein said list is received after having sent the fetch request.

In some embodiments, the processing element may be configured to prioritize one or more PLMNs of the list over preferred PLMNs (e.g., user preferred and operator preferred PLMNs), for PLMN selection.

In some embodiments, the processing element may be configured to receive an updated list of one or more PLMNs that support the given network slice in the given country.

In some embodiments, a non-transitory memory medium may include program instructions executable by a UE that, when executed, cause the UE to perform at least a portion or all of the above operations.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 5 illustrates an example of a length indicator field in an S-NSSAI, according to some embodiments.

FIG. 12 illustrates a method for operating a UE, to access a PLMN that supports a desired network slice, according to some embodiments.

FIG. 13 illustrates a method for operating an Access & Mobility Management Function in a PLMN, according to some embodiments.

Figure 1:
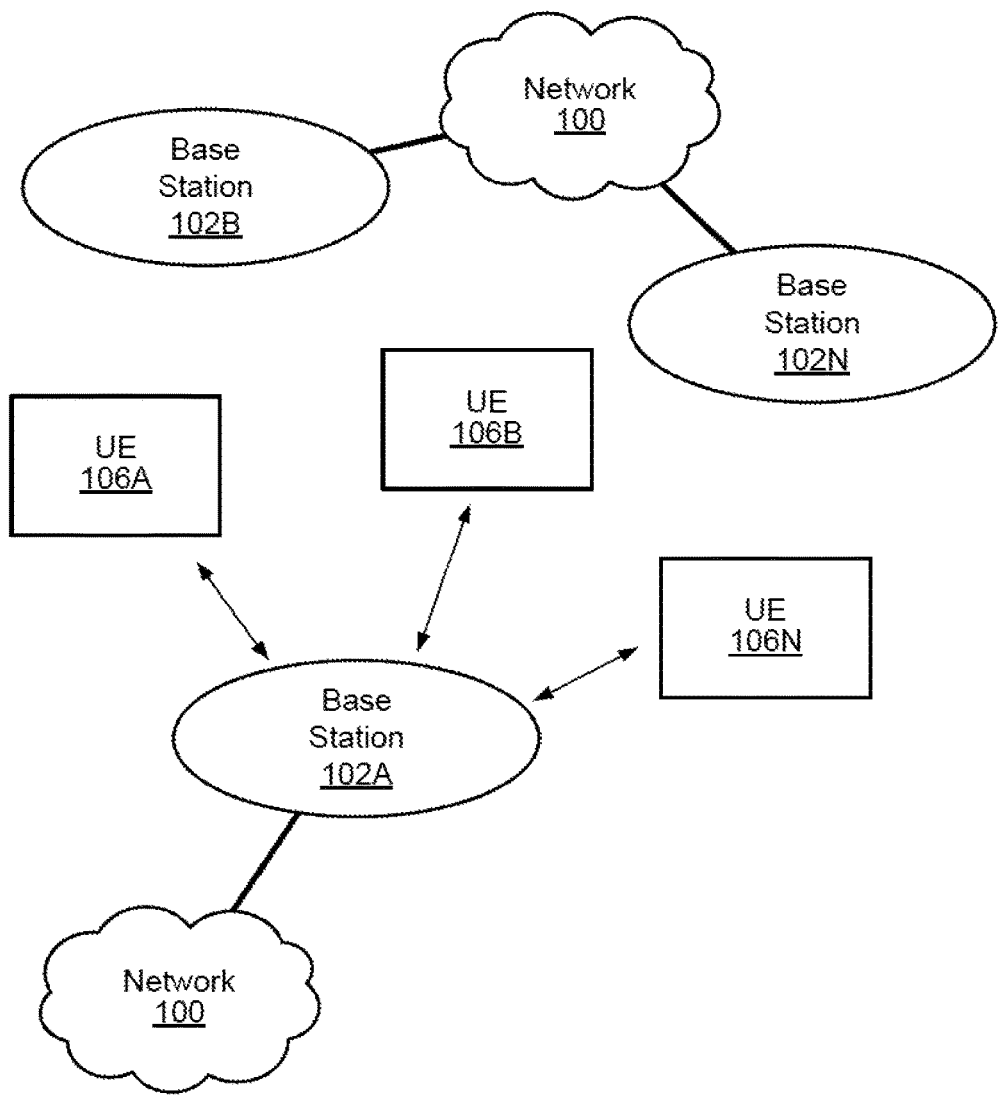
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

AMF: Access and Mobility Management Function
BS: Base Station
DL: Downlink
GSM: Global System for Mobile
GSMA: GSM Association
HNSSF: Home NSSF
HPLMN: Home Public Land Mobile Network
LTE: Long Term Evolution
NR: New Radio
PDCCH: Physical Downlink Control Channel
PLMN: Public Land Mobile Network
PUSCH: Physical Uplink Shared Channel
NSSAI: Network Slice Selection Assistance Information
NSSF: Network Slice Selection
RAT: Radio Access Technology
RF: Radio Frequency
S-NSSAI: Single Network Slice Selection Assistance Information
SMF: Session Management Function
UE: User Equipment
UL: Uplink
UMTS: Universal Mobile Telecommunication System
VPLMN: Visited Public Land Mobile Network Terms The following is a glossary of terms used in this disclosure Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, unmanned aerial vehicles (UAVs), unmanned aerial controllers (UACs) and vehicles, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
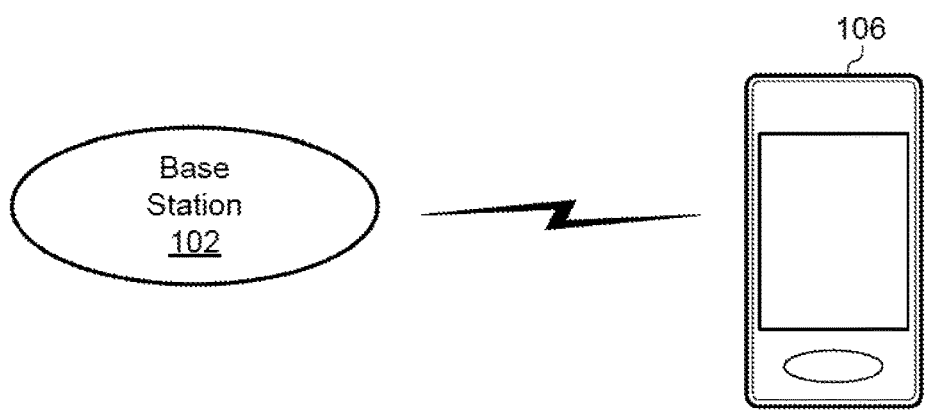
FIG. 2 illustrates a base station (BS) in communication with a user equipment (UE) device according to some embodiments.

FIGS. 1 and 2—Communication System

FIG. 1 illustrates a simplified example wireless communication system, according to one embodiment. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G NR, HSPA, 3GPP2 CDMA2000 (e.g., 1×RTT, 1×EV-DO, HRPD, eHIRPD), etc. Note that if the base station 102A is implemented in the context of LTE, it may alternately be referred to as an 'eNodeB'. Note that if the base station 102A is implemented in the context of 5G NR, it may alternately be referred to as an 'gNodeB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, NR, HSPA, 3GPP2 CDMA2000 (e.g., 1×RTT, 1×EV-DO, HRPD, eHIRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to one embodiment. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or NR (or LTE or 1×RTT, or LTE or GSM), and separate radios for communicating using each of Wi-Fi and Bluetooth. Other configurations are also possible.

Figure 3:
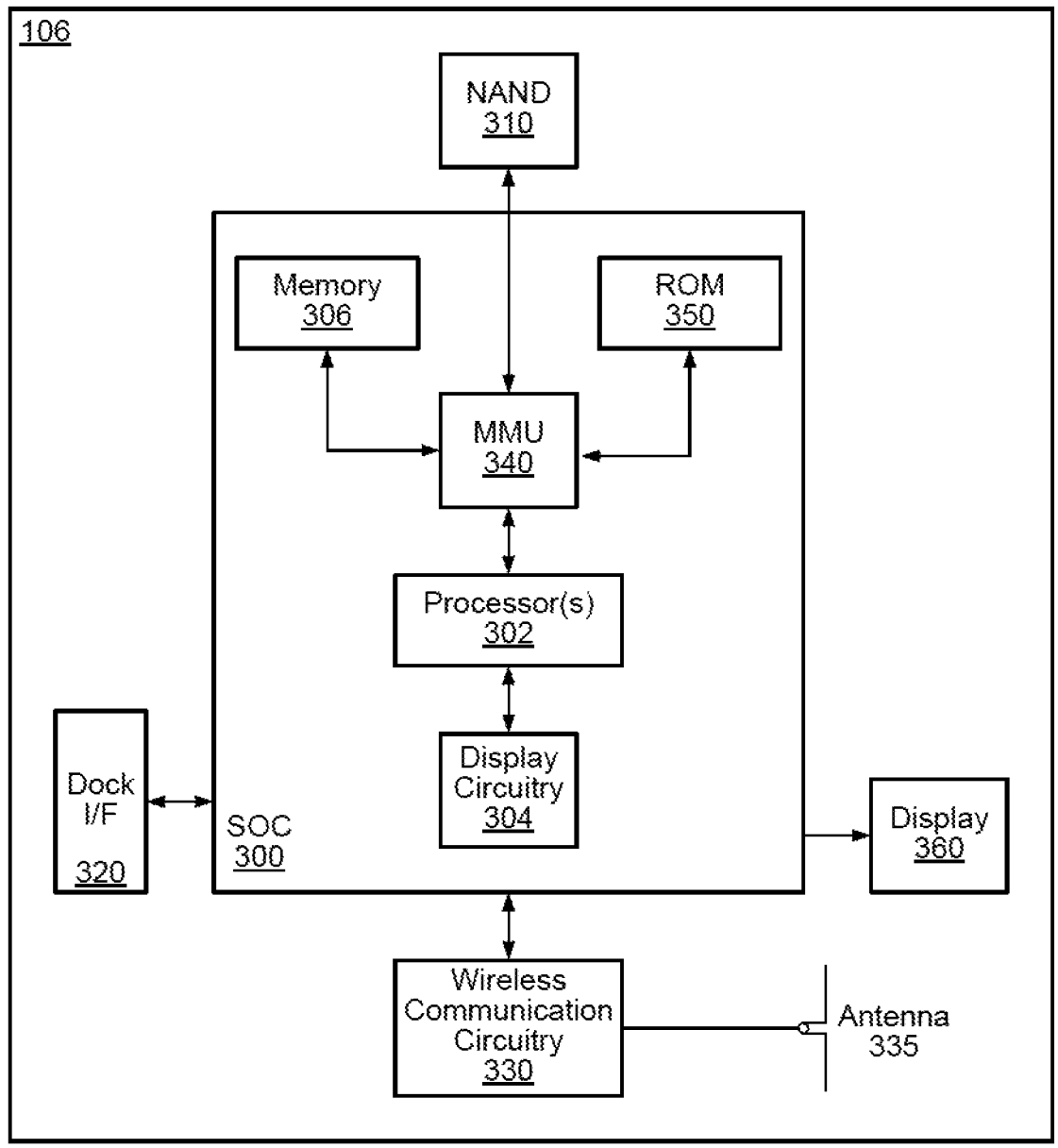
FIG. 3 illustrates an example block diagram of a UE according to some embodiments.

FIG. 3—Block Diagram of a UE

FIG. 3 illustrates an example block diagram of a UE 106, according to one embodiment. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, GPS, etc.). The UE may also include at least one SIM device, and may include two SIM devices, each providing a respective international mobile subscriber identity (IMSI) and associated functionality.

As shown, the UE device 106 may include at least one antenna (and possibly multiple antennas, e.g., for MIMO and/or for implementing different wireless communication technologies, among various possibilities) for performing wireless communication with base stations, access points, and/or other devices. For example, the UE device 106 may use antenna 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As described herein, the UE 106 may include hardware and software components for implementing features for performing more efficient cellular base station scanning, such as those described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein.

Figure 4:
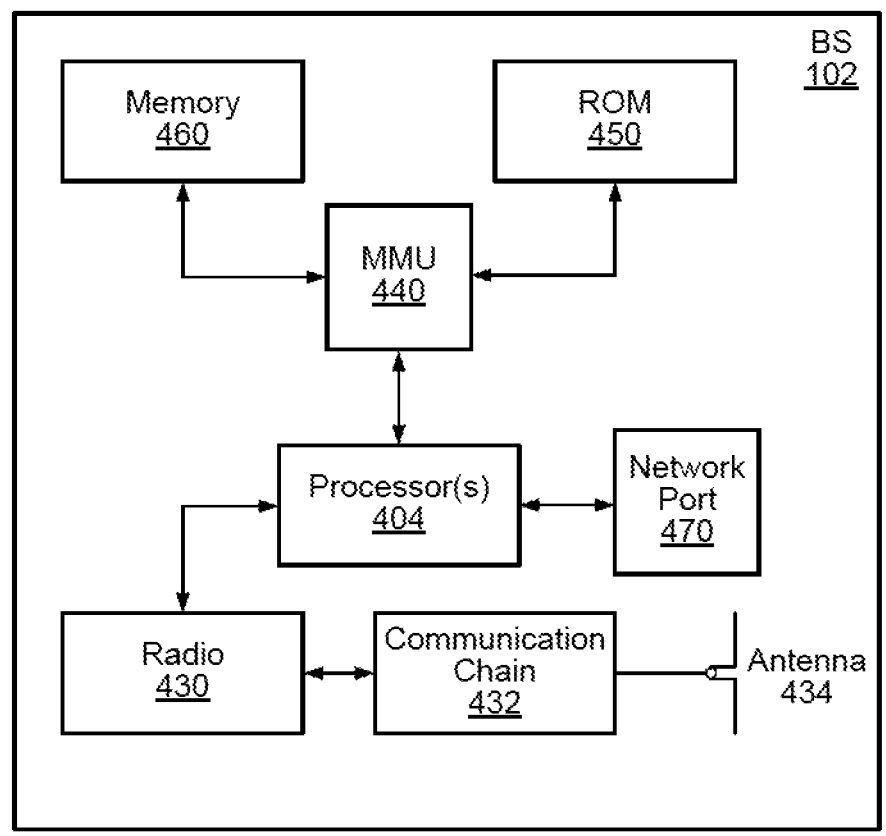
FIG. 4 illustrates an example block diagram of a BS according to some embodiments.

FIG. 4—Block Diagram of a Base Station

FIG. 4 illustrates an example block diagram of a base station 102, according to one embodiment. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Enhancement of Roaming PLMN Selection Using Area of Interest of an S-NSSAI

In some embodiments, knowledge of an "area of interest" of an S-NSSAI may be used to enhance roaming PLMN selection.

According to existing art, when is a UE is roaming in a country away from its HPLMN, the UE needs to attempt selection of a visited PLMN (VPLMN) with no awareness as to whether the PLMN supports a given mapped S-NSSAI of the HPLMN, e.g., an S-NSSAI identifying a network slice the UE (or an application running on the UE) is interested in using. The UE becomes aware only after a Non-Access Stratum (NAS) registration procedure is completed on the VPLMN. This lack of awareness may lead to numerous redundant registration attempts on VPLMNs which do not support the given S-NSSAI.

3GPP Network Slicing Support for Roaming

Section 5.15.6 of 3$^{rd}$ Generation Partnership Project Technical Specification 23.501 (3GPP TS 23.501), version 16.3.0, sets forth specifications related to network slicing support for roaming scenarios as follows.

Begin Quote

If the UE only uses standard S-NSSAI values, then the same S-NSSAI values can be used in VPLMN as in the HPLMN.

If the VPLMN and HPLMN have an SLA [Service Level Agreement] to support non-standard S-NSSAI values in the VPLMN, the NSSF [Network Slice Selection Function] of the VPLMN maps the Subscribed S-NSSAIs values to the respective S-NSSAI values to be used in the VPLMN. The S-NSSAI values to be used in the VPLMN are determined by the NSSF of the VPLMN based on the SLA. The NSSF of the VPLMN need not inform the HPLMN of which values are used in the VPLMN.

Depending on operator's policy and the configuration in the AMF [Access & Mobility Management Function], the AMF may decide the S-NSSAI values to be used in the VPLMN and the mapping to the Subscribed S-NSSAIs.

The UE constructs Requested NSSAI and provides the mapping of S-NSSAIs of the Requested NSSAI to HPLMN S-NSSAIs if the mapping is stored in the UE, as described in clause 5.15.5.2.1 of TS 23.501.

The NSSF in the VPLMN determines the Allowed NSSAI without interacting with the HPLMN.

The Allowed NSSAI in the Registration Accept includes S-NSSAI values used in the VPLMN. The mapping information described above is also provided to the UE with the Allowed NSSAI as described in clause 5.15.4 of TS 23.501.

In PDU Session Establishment procedure, the UE includes both:
 (a) the S-NSSAI that matches the application (that is triggering the PDU Session Request) within the NSSP in the URSP [UE Route Selection Policy] rules or within the UE Local Configuration as defined in clause 6.1.2.2.1 of TS 23.503; the value of this S-NSSAI is used in the HPLMN; and
 (b) an S-NSSAI belonging to the Allowed NSSAI that maps to (a) using the mapping of the Allowed NSSAI to HPLMN S-NSSAIs; the value of this S-NSSAI is used in the VPLMN.

For the home routed case, the V-SMF [Visited Session Management Function] sends the PDU Session Establishment Request message to the H-SMF [Home SMF] along with the S-NSSAI with the value used in the HPLMN (a).

When a PDU [Protocol Data Unit] Session is established, the CN [Core Network] provides to the AN [Access Network] the S-NSSAI with the value from the VPLMN corresponding to this PDU Session, as described in clause 5.15.5.3 of TS 25.501.

The Network Slice instance specific network functions in the VPLMN are selected by the VPLMN by using the S-NSSAI with the value used in the VPLMN and querying an NRF [Network Repository Function] that has either been pre-configured, or provided by the NSSF in the VPLMN. The Network Slice specific functions of the HPLMN (if applicable) are selected by the VPLMN by using the related S-NSSAI with the value used in the HPLMN via the support from an appropriate NRF in the HPLMN, identified as specified in clause 4.17.5 of TS 23.502 and, for SMF in clause 4.3.2.2.3.3 of TS 23.502.

End Quote

Length of S-NSSAI Contents

In some embodiments, the S-NSSAI (Single-Network Slice Selection Assistance Information) may include a length field and contents. The contents may have different forms depending on the value of the length field. For example, as shown in FIG. 5, the length field may be an octet (i.e., a set of eight bits), where certain ones of the possible states of the octet corresponding to respective forms for the contents. (SST stands for Slice/Service Type. SD standard for Slice Differentiator.) A first state corresponding to the hexadecimal value 01 includes SST; a second state corresponding to the hexadecimal value 02 includes SST and mapped HPLMN SST; a third state corresponding to the hexadecimal value 04 includes SST and SD; a fourth state corresponding to the hexadecimal value 05 includes SST, SD and mapped HPLMN SST; and a fifth state corresponding to the hexadecimal value 08 includes SST, SD, first state corresponding to the hexadecimal value 01 includes SST, and mapped HPLMN SD. Other states of the octet may be reserved and/or used to represent other possible forms for the contents.

In some embodiments, the length field may be the second octet in a multi-octet S-NSSAI, e.g., as defined in 3GPP TS 24.501, version 16.3.0.

H-NSSF to Store the Roaming Agreement for each S-NSSAI

In some embodiments, for each S-NSSAI value supported by an HPLMN, the Home-NSSF (i.e., the Network Slice Selection Function of the HPLMN) may store a data structure including: a list of areas (e.g., foreign countries or regions or states) such that each of the areas has one or more PLMNs that have agreed with the HPLMN to support the S-NSSAI; and for each such area, a corresponding list of identifiers identifying the one or more PLMNs. (While we may speak of agreements between PLMNs, it should be understood that agreements may be established between owners/operators of PLMNs.) For example, for a given network slice identified by an S-NSSAI value V1, the area list may identify foreign countries corresponding to MCC value X and MCC value Y. (MCC is an acronym for Mobile Country Code.) In the country with MCC value X, the corresponding identifier list may identify PLMNs $A_X$ and $B_X$ as supporting the S-NSSAI value V1. Similarly, in the country with MCC value Y, the corresponding identifier list may identify PLMNs $E_Y$ and $F_Y$ as supporting the S-NSSAI value V1.

The above described data structure may be referred to herein as "the roaming agreement structure". Anytime a roaming agreement is updated (e.g., added, or removed, or modified), the roaming agreement structure may be updated. For example, a list of PLMN identifiers for a particular country may be updated.

When the Home-NSSF updates the roaming agreement structure with respect to any S-NSSAI, it may notify the AMF of the HPLMN.

In some embodiments, the Home AMF may perform (or initiate) a UE configuration update (UCU) procedure using the updated roaming agreement structure. For example, the Home AMF may send the updated list of roaming PLMN identifiers (a) only for the impacted S-NSSAI, not for all the supported S-NSSAIs, and/or, (b) only for the impacted area.

In some embodiments, when performing the UCU procedure, the Home AMF may indicate changes related to each S-NSSAI in a set of allowed S-NSSAIs: addition or deletion or modification of contents of the allowed S-NSSAIs. It may be possible to perform multiple update tasks in the same UCU procedure.

The specific mechanisms by which roaming agreements are updated in the NSSF may be implementation dependent. For example, they could be updated by the carrier in different ways, e.g., by updating the NSSF directly or via a network function (NF) such as an application function (AF), or by providing a configuration option.

NSSF Roaming Agreement Table

In some embodiments, the roaming agreement structure may be realized as a table having a sub-table for each slice, e.g., as shown in Table 1 below. For example, for the network slice corresponding to S-NSSAI value a, the HPLMN may have roaming agreements with PLMN 01 and 02 in Country X, PLMN 03 in Country Y, and PLMN 07 in country Z. For the network slice corresponding to S-NSSAI value b, the HPLMN may have roaming agreements with PLMN 01 in Country X, PLMN 04 and 05 in Country Y, and PLMN 07 in Country Z. The UE may utilize GPS-derived position to determine which country in which it is located at a given time, and access the list of PLMN identifiers corresponding to that country and to a desired S-NSSAI value.

TABLE 1

Roaming Agreement Table

| Slice/Roaming Agreement | Country X | Country Y | Country Z |
|---|---|---|---|
| S-NSSAI value a | PLMN 01 PLMN 02 | PLMN 03 | PLMN 07 |
| S-NSSAI value b | PLMN 01 | PLMN 04 PLMN 05 | PLMN 07 |

Roaming Agreement for S-NSSAI Pushed in HPLMN (UE-Initiated)

In some embodiments, the UE may send a registration request to the HPLMN. The registration request may include a list of S-NSSAIs that identify corresponding network slices to which the UE requests access. Each of the listed S-NSSAIs may contain a new information element—"request-PLMN-list". The value of the "request-PLMN-list" IE of an S-NSSAI may be set to true or false, based on whether the UE already has in its memory the supporting PLMN list for the S-NSSAI, e.g., the list of PLMN identifiers for PLMNs with roaming agreements to support the S-NSSAI.

For an S-NSSAI in the requested S-NSSAI list that has request-PLMN-list set to true, the Home AMF may send an extraction request to the Home NSSF, requesting the Home NSSF to extract the corresponding supporting PLMN list. In response to the query, the Home NSSF may check its roaming agreement structure to extract the supporting PLMN list for the S-NSSAI(s), and send the extracted list to the Home AMF.

The Home AMF may send a registration accept message to the UE, including a list of one or more allowed S-NSSAIs. (In general, the list of allowed S-NSSAIs is provided by a Serving PLMN, e.g., during a registration procedure, and indicates the S-NSSAI values the UE may use in the Serving PLMN.) As part of each allowed S-NSSAI, the Home AMF may include a new information element (IE) that contains the associated supporting PLMN list.

The registration accept message may also include a list of one or more rejected S-NSSAIs, e.g., with cause and validity of rejection for each rejected S-NSSAI. (A rejected S-NSSAI is an S-NSSAI that the UE is not allowed to use on the PLMN that sends the rejection list.) In some embodiments, when roaming to a different country (other than the home country), the UE may examine the supporting PLMN list(s) in the allowed S-NSSAI list and/or the supporting PLMN list(s) in the rejected S-NSSAI list, and decide to stay registered in the current PLMN or switch to a different PLMN.

In some embodiments, considering the size of the supporting PLMN list, this list may be sent as a new optional IE, outside (e.g., after) the Allowed S-NSSAI to which it corresponds.

Supporting PLMN List

The supporting PLMN lists may be large. To send the supporting PLMN list for every S-NSSAI in the Allowed NSSAI would consume a large amount of communication channel resources. Thus, the UE may set the "request-PLMN-list" IE for an S-NSSAI to false if the UE already has the corresponding supporting PLMN list stored in its memory.

In some embodiments, the UE may specify one or more countries (e.g., as indicated by one or more corresponding MCCs) for which it is requesting the supporting PLMN list(s). The one or more countries may be specified in the registration request or in some other message sent to the Home PLMN (or to a VPLMN). Based on future scheduled events for the user (e.g., inputs from iCal, Siri, etc.), the UE may predict that the UE may be in a given foreign country starting a given future time (e.g., in China next week), and thus selectively fetch the supporting PLMN list(s) only for the given country (e.g., MCC equal to China). Thus, this is another technique to reduce the message size.

In some embodiments, a validity timer period may be added to the supporting PLMN list that is sent to the UE for a given allowed S-NSSAI. The supporting PLMN list is guaranteed to be valid at least for the amount of time indicated by the validity timer period, e.g., starting from the time of transmission of the supporting PLMN list. Thus, the UE need not request the supporting PLMN list for a given S-NSSAI if the validity timer period has not yet expired. When the UE receives a supporting PLMN list for a given S-NSSAI, it may store the time of receipt and the value of the validity timer period so that it will be able to determine whether to request the PLMN list at a time of next registration. In some embodiments, the validity timer period may be value on the order of hours or days. The validity timer may be persisted across reboots of the UE, e.g., by using the UE's non-volatile memory. (The validity timer period and the start time of the validity timer may be stored in the non-volatile memory.)

In some embodiments, the value of the supporting PLMN list for a given allowed S-NSSAI shall be valid in the UE even after power cycle, until the expiry of the validity timer period, or until a UE Configuration Update command with an updated supporting PLMN list for the allowed S-NSSAI is received by the UE.

UE-Initiated Transfer of S-NSSAI Roaming Agreements in HPLMN

Figure 6:
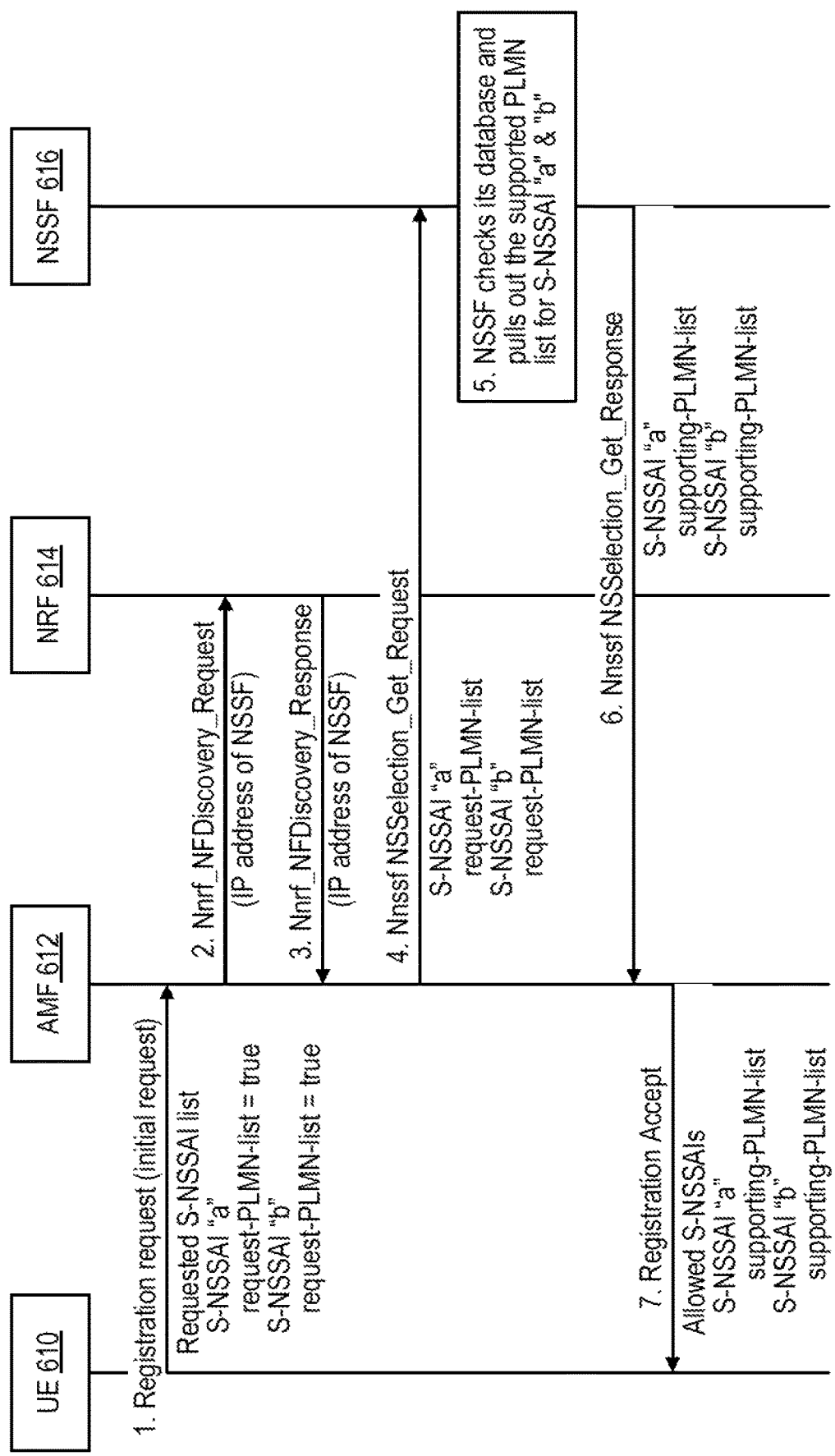
FIG. 6 illustrates an example of a UE-initiated transfer of S-NSSAI roaming agreements while in the Home PLMN, according to some embodiments.

FIG. 6 illustrates an example of a UE-initiated transfer of S-NSSAI roaming agreements (as represented by the supporting PLMNs lists) while in the Home PLMN, according to some embodiments. This example may involve a UE 610, an AMF 612, an NRF 614, and an NSSF 616. The AMF, NRF and NSSF may be network functions or nodes of the home PLMN: AMF represents Access & Mobility Management Function; NRF represents Network Repository Function; and NSSF represents Network Slice Selection Function.

At 1, the UE may send a registration request (e.g., a registration request of type value set to indicate an initial request, at the very first power-up by the UE) to the AMF, e.g., via a base station (such as a gNB of 3GPP 5G). The registration request may include: a requested S-NSSAI value "a" with request-PLMN-list set to true; and a requested S-NSSAI value "b" with request-PLMN-list set to true. (In some embodiments, the registration request may additionally or alternatively include an identification of one or more countries to be visited in the future, e.g., as discussed above.)

At 2, the AMF may send to the NRF a request for the IP address of the NSSF. The request is denoted Nnrf_NFDiscovery_Request. The prefix "Nnrf" designates the message as targeted for the NRF.

At 3, the NRF may send to the AMF a response (denoted Nnrf_NFDiscovery_Response), including the IP address of the NSSF.

At 4, the AMF may send to the NSSF a request (denoted Nnssf_NSSelection_Get_Request) including: the S-NSSAI value "a" with a request for the corresponding supporting PLMN list; and the S-NSSAI value "b" with a request for the corresponding supporting PLMN list. The IP address received at 3 may be used to target the NSSF. (In some embodiments, the request may additionally or alternatively include the identification of the one or more countries to be visited in the future.)

At 5, the NSSF may check its roaming agreement database, and pull out the supporting PLMN lists for S-NSSAI values "a" and "b". (In some embodiments, NSSF may pull out only the supporting PLMN lists for the one or more identified countries.)

At 6, the NSSF may send to the AMF a response (denoted Nnssf_NSSelection_Get_Response) including: the S-NSSAI value "a" with the corresponding supporting PLMN list; and the S-NSSAI value "b" with the corresponding supporting PLMN list. (In some embodiments, the supporting PLMN lists sent to the AMF are limited to lists corresponding to the one or more identified countries.)

At 7, the AMF may send to the UE a Registration Accept message including the Allowed S-NSSAIs. The Allowed S-NSSAIs may include: the S-NSSAI value "a" with the corresponding supporting PLMN list; and the S-NSSAI value "b" with the corresponding supporting PLMN list. (In some embodiments, the supporting PLMN lists sent to the UE may be limited to lists corresponding to the one or more identified countries.)

In any of the various embodiments and examples presented herein, messages transferred between the UE and the AMF may be transferred via a base station (e.g., a gNB of 3GPP 5G NR), e.g., as suggested in FIG. 1.

Selective Transfer (UE Initiated) of S-NSSAI Roaming Agreements in HPLMN

Figure 7:
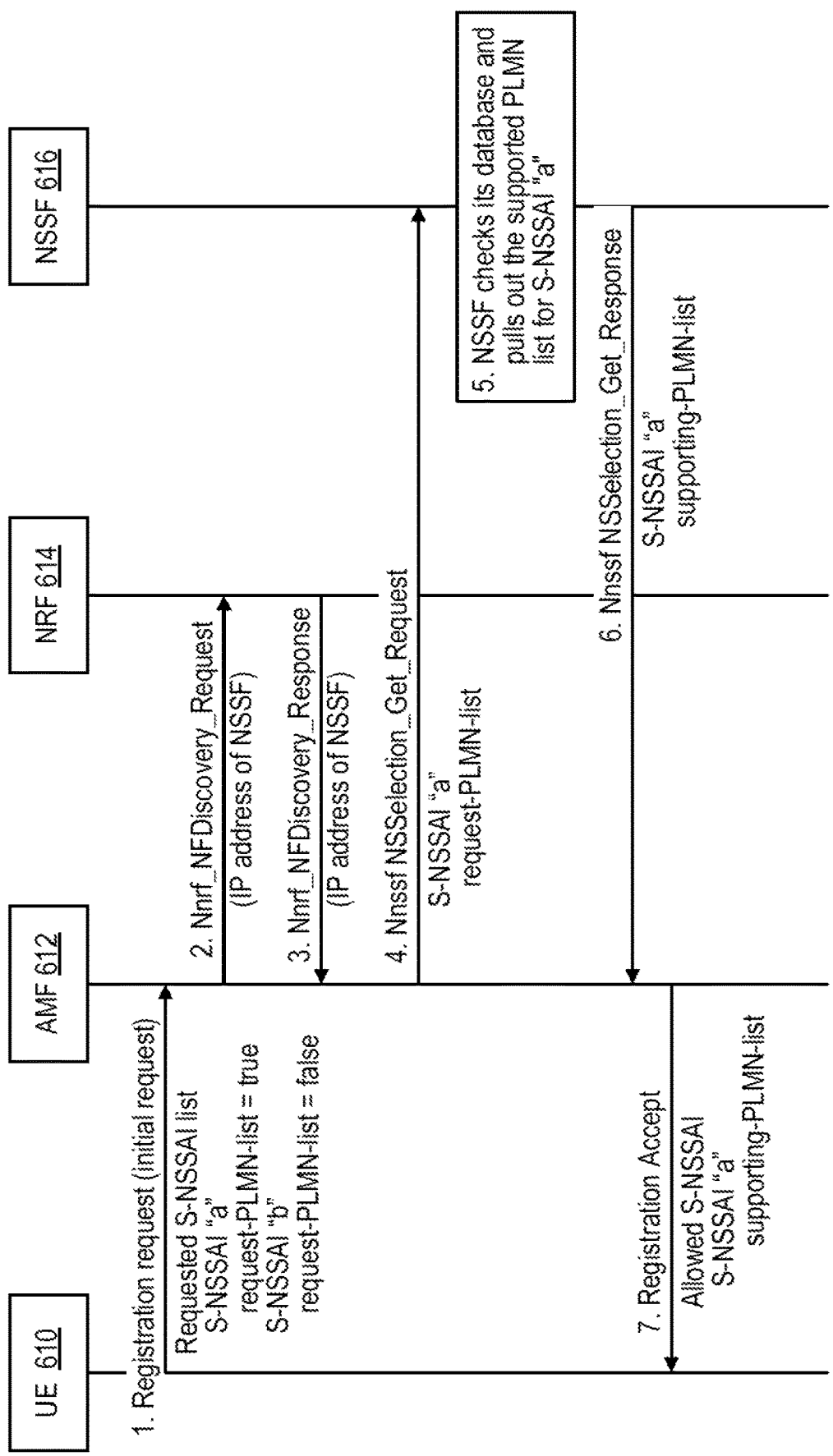
FIG. 7 illustrates an example of selective (and UE initiated) transfer of S-NSSAI roaming agreements while in the HPLMN, according to some embodiments.

FIG. 7 illustrates an example of the selective (and UE initiated) transfer of S-NSSAI roaming agreements while in the HPLMN, according to some embodiments. This example may involve the UE 610, the AMF 612, the NRF 614, and the NSSF 616.

At 1, the UE may send a registration request (initial request) to the AMF, e.g., via a base station (such as a gNB of 3GPP 5G). The registration request may include: a requested S-NSSAI value "a" with request-PLMN-list set to true; and a requested S-NSSAI value "b" with request-PLMN-list set to false.

At 2, the AMF may send to the NRF a request for the IP address of the NSSF. (The request is denoted Nnrf_NFDiscovery_Request).

At 3, the NRF may send to the AMF a response (denoted Nnrf_NFDiscovery_Response), including the IP address of the NSSF.

At 4, the AMF may send to the NSSF a request (denoted Nnssf_NSSelection_Get_Request) including the S-NSSAI value "a" with a request for the corresponding supporting PLMN list. The IP address received at 3 may be used to target the NSSF.

At 5, the NSSF may check its roaming agreement database, and pull out the supporting PLMN list for S-NSSAI value "a".

At 6, the NSSF may send to the AMF a response (denoted Nnssf_NSSelection_Get_Response) including: the S-NSSAI value "a" with the corresponding supporting PLMN list.

At 7, the AMF may send to the UE a Registration Accept message including the Allowed S-NSSAI. The Allowed S-NSSAI itself includes the S-NSSAI value "a" with the corresponding supporting PLMN list.

Roaming Agreement for S-NSSAI Pushed in HPLMN (NW-Initiated)

In some embodiments, the NSSF of the HPLMN may update a supporting PLMN list corresponding to an S-NSSAI in response to a roaming agreement change. A roaming agreement change may include: an addition of a new PLMN, e.g., in response to the establishment of a new agreement; a removal of an existing PLMN, e.g., in response to the end of an existing agreement; or a modification of an existing PLMN.

The NSSF may notify the Home AMF of the change in the supporting PLMN list for a given S-NSSAI.

The Home AMF may initiate a UE configuration update (UCU) command to (proactively) inform the UE of the updated state of a supporting PLMN list corresponding to an S-NSSAI.

In some embodiments, the Home AMF send an update message to the UE including a list of S-NSSAIs and their respective supporting PLMN lists, wherein the S-NSSAI list includes only S-NSSAIs whose supporting PLMN lists have been updated. The update message does not include any S-NSSAI whose supporting PLMN list has not been updated. (If the supporting PLMN list for an S-NSSAI has not been updated, the UE does not need to be sent that PLMN list since the PLMN list existing in the memory of the UE is still valid.)

The UE may delete an existing supporting PLMN list for an S-NSSAI identified in the UCU command, and replace it with the received supporting PLMN list corresponding to that S-NSSAI.

In alternative embodiments, when a roaming agreement change for a given S-NSSAI impacts only a single country, the Home AMF may send to the UE the PLMN sub-list corresponding to the country and the given S-NSSAI, not the entire PLMN list. The UE may then update only that sub-list instead of deleting and replacing an entire PLMN list corresponding to the given S-NSSAI.

In some embodiments, based on the supporting PLMN list(s) in the allowed S-NSSAI list and/or the supporting PLMN list(s) in the rejected S-NSSAI list, the UE may decide to stay registered in the current PLMN or switch to a different PLMN.

In some embodiments, the mechanisms by which a roaming agreement may be updated in the NSSF is implementation dependent. They could be updated by the carrier in different ways, e.g., by updating the NSSF directly or via any other network function (NF).

NW-Initiated Transfer of Selected S-NSSAI Roaming Agreement in HPLMN

Figure 8:
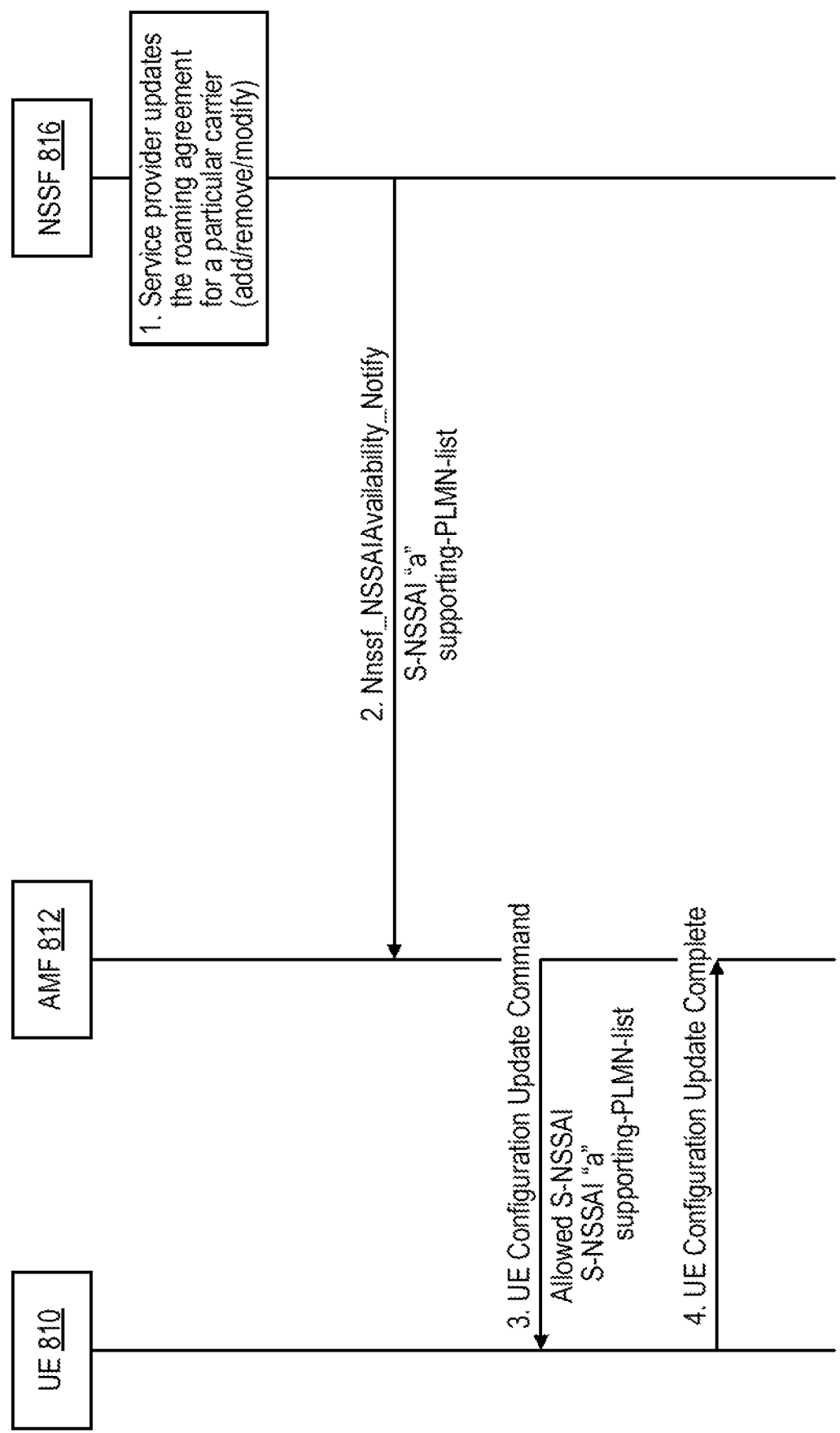
FIG. 8 illustrates an example of a network-initiated transfer of an S-NSSAI roaming agreement when a UE is in the HPLMN, according to some embodiments.

FIG. 8 illustrates an example of a network-initiated transfer of an S-NSSAI Roaming Agreement when a UE is in the HIPLMN, according to some embodiments. This example involves a UE 810, an AMF 812, and an NSSF 816. The AMF, NRF and NSSF belong to a home PLMN of the UE.

At 1, a service provider may update a roaming agreement for a particular carrier, e.g., by adding a PLMN, removing a PLMN, or modifying a PLMN.

At 2, the NSSF may send to the AMF a notification message (denoted Nnssf_NSSAIAvailability_Notify) including the S-NSSAI value "a" and the supporting PLMN list for the S-NSSAI value "a".

At 3, the AMF may send to the UE a configuration update command including: an Allowed S-NSSAI with value equal to the S-NSSAI value "a"; and the supporting PLMN list for the S-NSSAI value "a".

At 4, the UE may send to the AMF, a "UE Configuration Update Complete" message indicating that is has successfully completed the update of the supporting PLMN list associated with S-NSSAI value "a".

Roaming Agreement Dependent on Validity Timer Period

In some embodiments, for each S-NSSAI, the respective supporting PLMN list may have a respective validity timer period. The validity time period is a period of time that the respective supporting PLMN list is guaranteed to be valid. When a supporting PLMN list is sent to the UE, the respective validity timer period is sent with the supporting PLMN list. These embodiments may be used, e.g., where a user of the UE has purchased a temporary roaming agreement in anticipation of visiting a foreign country. The temporary roaming agreement may be of limited time duration, e.g., a limited number of hours, days, or weeks.

In some embodiments, the validity timer may be in terms of time. For example, the supporting PLMN list (also referred herein to as the "roaming PLMN list") may be valid for a few hours, days or weeks. After the validity period expires, the list becomes invalid. (The PLMNs of the list may no longer be usable by the UE.) This could be used in scenarios when customer pays for a roaming contract which is valid for a few hours or days.

Figure 9:
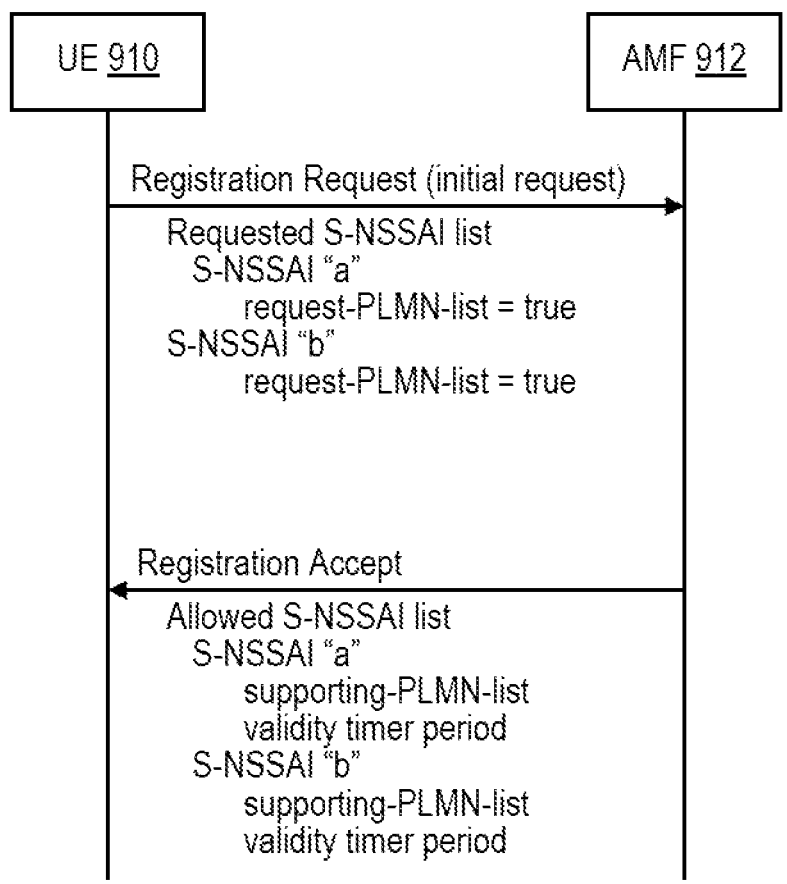
FIG. 9 illustrates an example of use of a validity timer to control or limit a period of validity of a list of supporting PLMNs, according to some embodiments.

In some embodiments, the validity timer period may be provided to the UE as part of a registration accept as shown in FIG. 9. A UE 910 may sends to an AMF 912 of the UE's Home PLMN a registration request (an initial request) including a list of requested S-NSSAI. For example, the requested S-NSSAI list may include: an S-NSSAI value "a" with request-PLMN-list set equal to true; and an S-NSSAI value "b" with request-PLMN-list set equal to true. (Request-PLMN-list is an information element indicating whether the UE is requesting the supporting PLMN list for a respective S-NSSAI value.) In response to the registration request, the AMF may send to the UE a registration accept message including a list of allowed S-NSSAIs. For example, the allowed S-NSSAIs list may include: the S-NSSAI value "a" with the associated supporting PLMN list and associated validity timer period; and the S-NSSAI value "b" with the associated supporting PLMN list and associated validity timer period.

Figure 10:
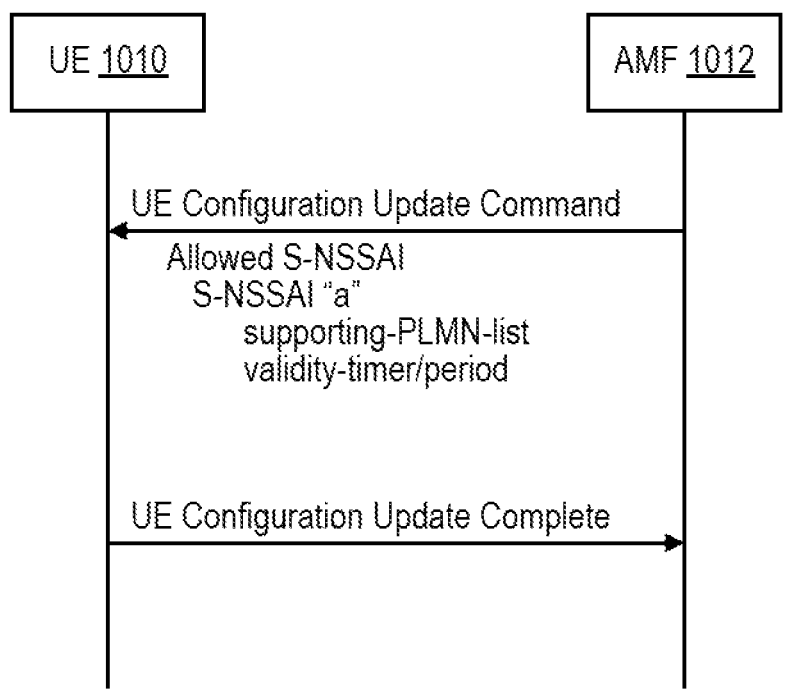
FIG. 10 illustrates an example where a validity timer value is sent to a UE as part of a configuration update command, according to some embodiments.

In some embodiments, the validity timer period may be provided to the UE as part of a configuration update command, as shown in FIG. 10. An AMF 1012 of the UE's Home PLMN may send to a UE 1010 a UE configuration update command including an allowed S-NSSAI (S-NSSAI value "a" in the illustrated example), the associated supporting PLMN list, and the associated validity timer period. The UE stores the allowed S-NSSAI, the supporting PLMN list and the validity timer period in its memory. The UE may respond by sending a UE configuration update complete message, indicating that the configuration update has been successfully completed.

Roaming Agreement for S-NSSAI Pushed in VPLMN

A potential drawback of pushing the supporting PLMN list to the UE in the HPLMN is due to the large size of the list. The UE may access the list only when it moves to a different country. If the UE is always located within the HPLMN, the transfer and storage of the list represent a waste of resources and memory.

In some embodiments, the supporting PLMN list may be provided to the UE when it sends a registration request to a Visited PLMN (VPLMN), while roaming away from the home country. The registration request may include a list of one or more requested S-NSSAIs. Each S-NSSAI of the list may include the mapped HPLMN SST field, e.g., corresponding to the second, fourth, or fifth state of the length indicator shown in FIG. 5. (SST is an acronym for Slice/Service Type.)

In response to the registration request sent by the UE to the VPLMN, the AMF of the VPLMN may send to the UE a registration accept message including a list of one or more Allowed S-NSSAIs and a list of one or more Rejected S-NSSAIs. The registration accept message may also include: the supporting PLMN list for each S-NSSAI in Allowed S-NSSAI list; and the supporting PLMN list for each S-NSSAI in the Rejected S-NSSAI list.

Based on the supporting PLMN list(s) in the Allowed S-NSSAI list and/or the supporting PLMN list(s) in the Rejected S-NSSAI list, the UE may decide to stay registered in the current PLMN or switch to a different PLMN.

UE Implementation as Per NSSF Roaming Agreement Table

In some embodiments, the UE may perform PLMN selection based on a roaming agreement table, an example of which is shown in Table 2 below.

TABLE 2

Roaming Agreement Table

| Slice/Roaming Agreement | Country X | Country Y | Country Z |
|---|---|---|---|
| S-NSSAI value a | PLMN 01 PLMN 02 | PLMN 03 | PLMN 07 |
| S-NSSAI value b | PLMN 01 | PLMN 04 PLMN 05 | PLMN 07 |

In Country X, the UE may prioritize PLMN 01, since it supports both S-NSSAI value a and S-NSSAI value b. (In other words, PLMN 01 supports slice a and slice b.)

In Country Y, the UE may not have any prioritization. The UE may then follow a Preferred PLMN (PPLMN) priority list by default. However, once the user expresses an interest to utilize a particular slice (e.g., by selecting a particular app on the UE), the UE may immediately move to the VPLMN that supports this slice. (The VPLMN that supports the slice may be communicated to the UE through the registration access message. This registration access message is sent by the V-AMF. For example, if the user has expressed an interest to utilize the slice corresponding to S-NSSAI value a while in Country Y, the UE may attempt to register with PLMN 03.

In Country Z, the UE may prioritize PLMN 07.

In some embodiments, the UE may assign the slice PLMN (e.g., a VPLMN associated with the slice of user expressed interest) a priority higher than any of the PLMNs on the PPLMN list until service expiry (e.g., based on the validity timer) of the slice VPLMN or until PLMN change due to non-availability of the slice VPLMN.

UE Implementation on PLMN Selection Based on Supporting PLMN List

According to a generic priority scheme for PLMN selection, the UE may select a PLMN that has the highest priority in the following hierarchy:

EHPLMN>UPLMN>OPLMN>Any Other PLMN.

EHPLMN is an acronym for Equivalent HPLMN. An Equivalent HPLMN is a PLMN that is guaranteed to be equivalent to the HPLMN (of the UE) in terms of supported network slices. UPLMN stands for User PLMN, and represents a user defined PLMN priority in a given roaming country. For example, a device software vendor may program the UE device with preferred PLMN(s) in the given roaming country. (A device SW vendor might define a rule that if a UE subscribed with carrier X roams to country Y, then PLMNs A and B are preferred.) OPLMN stands for Operator PLMN, and corresponds to the PLMN priority specified for the given country by the carrier's SIM card. The term "Any Other PLMN" means any PLMN not belonging to the higher PLMN categories—EHPLMN, UPLMN, and OPLMN.

In some embodiments, according to a modified priority scheme for PLMN selection, the UE may select a PLMN that has the highest priority in the following hierarchy:

EHPLMN>Slice PLMN>Preferred PLMN>Any Other PLMN.

Slice PLMN refers to a PLMN that belongs to the supported PLMN list received from the network (e.g., the Home PLMN). Preferred PLMN refers to any PLMN in the UPLMN and OPLMN categories. "Any Other PLMN" refers to any PLMN not belonging to the categories of higher priority—EHPLMN, Slice PLMN, Preferred PLMN.

Based on the supporting PLMN list(s) in the Allowed S-NSSAI list and/or the supporting PLMN list(s) in the Rejected S-NSSAI list, the UE may decide to stay registered in current PLMN or switch to a different PLMN. This change may occur through reselection. Reselection may be initiated upon expiry of a SIM reselection timer with initial value $T_{SWITCH}$. (The SIM reselection timer may be incremental, which means that it is telescopic in nature. For example, it may start with initial value equal to 3 minutes, and in the next iteration, the initial value is increased to 5 minutes, then 6 minutes, and so on.) The timer may be started when the UE is camped to any PLMN. For example, the value of $T_{SWITCH}$ may be a number of minutes such as 3 minutes, or 5 minutes, or 6 minutes, or 8 minutes. Any of a wide variety of values may be used.

In some embodiments, the UE may perform PLMN selection based on a dynamic PLMN selection priority table, e.g., for the country in which the UE is currently roaming. The dynamic PLMN selection priority table may include one or more Allowed S-NSSAIs per VPLMN (or one or more supporting VPLMNs per S-NSSAI).

The UE may maintain a priority list for the supported (or allowed) S-NSSAIs received in the HPLMN.

The priority of a VPLMN with one or more supported (or allowed) S-NSSAI may be incremented over PPLMN (OPLMN/UPLMN). In the case where no Preferred PLMN is available, the VPLMN in country X that support the maximum number of slices (e.g., S-NSSAIs) may be assigned the highest priority for PLMN selection while roaming in country X.

The UE may register to the highest priority PLMN based on the dynamic PLMN selection priority table.

In some embodiments, one or more exit criteria may be employed.

For example, when a user's subscription to a slice expires or any expiry of an S-NSSAI occurs, the UE may reinstate the Preferred PLMN (PPLMN) list, and reselection to the highest priority PLMN may be based on SIM Elementary Files (EFs). SIM is an acronym for Subscriber Identity Module.

Another condition for the UE to move back to the PPLMN list from the dynamic PLMN selection priority table may be unavailability of any slice preferred VPLMN. If no VPLMN of the EHPLMN, Slice PLMN and PPLMN categories supports the requested slice, the UE may select an arbitrary PLMN.

In some embodiments, the dynamic PLMN selection priority table may be configurable or reconfigurable, e.g., using components of a registration accept message sent from the home AMF and routed through V-AMF (i.e., the AMF of the Visited PLMN).

UE Implementation Based on Entitlement Server

Figure 11:
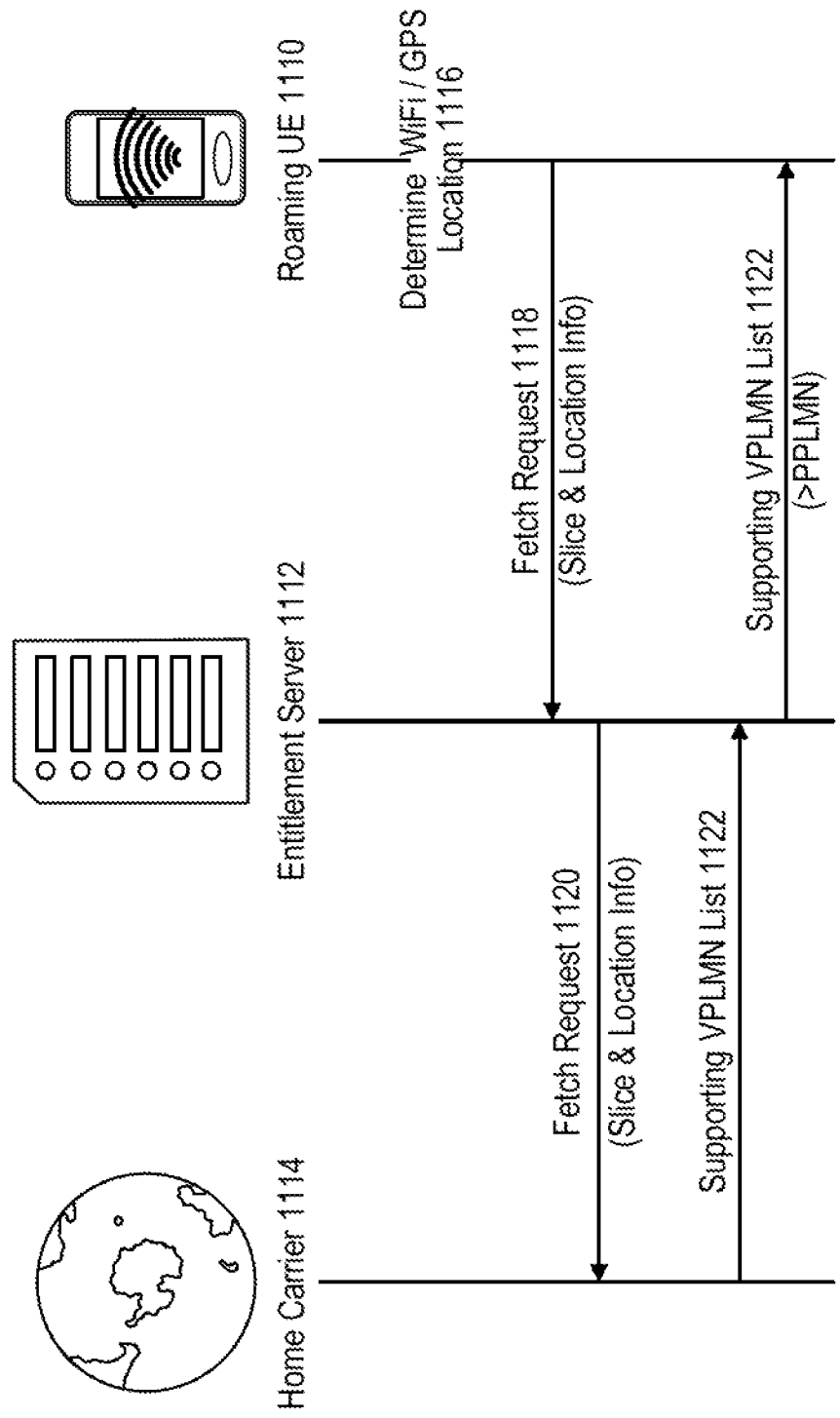
FIG. 11 illustrates an example of a mechanism for providing slice-supporting PLMN identification information to a UE using an entitlement server, according to some embodiments.

In some embodiments, the roaming UE 1110 may receive a supporting VPLMN list 1122 for given network slice (corresponding to a given S-NSSAI) from an entitlement server 1112, e.g., as shown in FIG. 11.

If the UE fails to find an EHPLMN available while roaming in a given country, the UE may determine its current roaming location, as indicated at 1116. The current roaming location may be an identification of the country in which the UE is currently roaming. The UE may determine its current roaming location, e.g., using GPS coordinates of the UE and/or using a WiFi based location mechanism. (GPS is an acronym for Global Positioning System.) For example, the UE may determine its approximate location based on the location of a WiFi access point to which it connects.

In response to determining its current roaming location, the UE may send a fetch request 1118 to the entitlement server. The fetch request may include the current roaming location and an identification of a network slice to which the UE desires access. The network slice identification may be an S-NSSAI.

In response to receiving the fetch request 1118, the entitlement server 1112 may send a (secure) fetch request 1120 to the home carrier 1114 (e.g., the HPLMN of the UE). The fetch request may include the current UE roaming location and an identification of the network slice.

In response to the fetch request 1120, the home carrier 1114 may send to the entitlement server a list 1122 of VPLMN(s) that support the identified network slice in the country corresponding to the current UE roaming location. More generally, the home carrier may send a set of supported slices, services and supporting PLMNs for the current UE roaming location to the entitlement server.

In response to receiving the supporting PLMN list 1122, the entitlement server may forward the supporting PLMN list to the UE 1110. (The supporting PLMN list may be ordered to indicating a priority of preference.) The UE stores the supporting PLMN list in its memory.

The UE may prioritize the VPLMNs of the supporting PLMN list over Preferred PLMNs (of the OPMN and UPLMN categories), when deciding on a VPLMN on which to camp.

In case the supporting PLMN list is not available or the Home PLMN provides PLMN(s) that are not available at the current location, the UE may prioritize the SIM preferred PLMN, for camping and other services. The UE may receive the updated VPLMN list for respective slice after registration on a PPLMN, or attempt at a later time to use an entitlement server provided PLMN list to gain services when HPLMN-provided PLMN becomes available to the UE.

The entitlement server may be realized as a cloud service for secure communication and routing of roaming service information between the Home Network and the UE.

FIG. 12: Roaming Network Slice Selection Based on Stored List of Supporting PLMNs In some embodiments, a method 1200 for operating a wireless user equipment (UE) device may include the operations shown in FIG. 12. (The method 1200 may also include any subset of the elements, embodiments and features described above in connection with FIGS. 1-11.) The wireless UE device may be configured as variously described above, e.g., as described in connection with user equipment 106 of FIG. 3. The method 1200 may be performed by a processing element of the UE device.

At 1210, the processing element may receive a list of one or more Public Land Mobile Networks (PLMNs) that support a given network slice in a given country, where the given country is different from a home country of a home PLMN of the UE, wherein the given network slice is supported in the home PLMN. The list may be stored in a memory (e.g., a non-volatile memory) of the UE.

At 1215, in response to determining that the UE is located in the given country and that access to the given network slice is desired, the processing element may access (e.g., register with or connect to) a PLMN of said list, to use the given network slice. (Alternatively, in response to said determining, the processing element may prioritize access of a PLMN of said list, e.g., over a Preferred PLMN, e.g., as variously described above.) The UE may determine that it is located in the given country, e.g., by determining GPS position of the UE, and determining that the GPS position is within the given country.

In some embodiments, the action of accessing the PLMN of said list is preceded by an action of selecting the PLMN from the list using any of various selection criteria. For example, the processing element may select the PLMN that is first (or highest) on the list in cases where the list (as received) is ordered according to selection priority. As another example, the processing element may select the PLMN of the list that has the highest measured signal strength, Signal to Noise Ratio (SINR), Reference Signal Received Power (RSRP), or any other measure of signal or connection quality.

In some embodiments, the processing element may access the PLMN of the list by sending a registration request (or a connection request or random access preamble) to the PLMN. The registration request may include an identifier of the given network slice.

In some embodiments, the processing element may transmit a registration request (or other message) to the Home PLMN while in the home county or in the given country, e.g., as variously described above. The list may be received from the Home PLMN after having transmitted the registration request. (The Network Slice Selection Function of the Home PLMN may store and maintain the list.)

In some embodiments, the registration request (or other message) may include a requested S-NSSAI (Single-Network Slice Selection Assistance Information) value associated with the given network slice, e.g., as variously described above. The S-NSSAI value may include an information element (IE) indicating whether the list of one or more PLMNs is requested.

In some embodiments, the registration request (or other message) may include an identification of the given country, e.g., the Mobile Country Code (MCC) of the given country. In some embodiments, the registration request may include an identification of one or more roaming countries including the given country, e.g., as variously described above. Thus, the processing element may receive one or more lists corresponding to the one or more roaming countries, with each list including one or more PLMNs that support the given network slice in the corresponding roaming country. Thus, the processing element may not be inundated with all lists for all countries, or all lists for all network slices.

In some embodiments, while the UE is in the given country, the processing element may send to a roaming PLMN in the given country a registration request (or other message) including an identification of a second country different from home country and different from the given country. The roaming PLMN may contact the Home NSSF to obtain a list of one or more PLMNs that support the given slice in the second country, and forward that list to the UE. The processing element may receive the list, e.g., from a base station of the roaming PLMN. This registration request that includes the identification of the second country may be sent while the UE is in the given country, e.g., in anticipation of entering the second country in the future.

In some embodiments, the list may be received along with a validity timer period indicating a length of time within which the list is guaranteed to be valid, e.g., as variously described above.

In some embodiments, the processing element may be configured to receive a validity timer period that indicates a period of time after which the one or more PLMNs of the list will no longer support the given slice. The validity timer may be persisted across reboots, e.g., as variously described above.

In some embodiments, the processing element may receive the list: (a) when the UE is associated with (e.g., camped on, or connected to) the Home PLMN in the home country; and (b) without any request asserted by the UE for the list. For example, the Home PLMN may: update the list when a roaming agreement involving the Home PLMN is established, or terminated, or modified; and send the updated state of the list to the UE in response to the update. The list may be received from the Home PLMN, e.g., from an Access & Mobility Management Function (AMF) of the Home PLMN. The UE may communicate with the Home PLMN via a base station (e.g., a gNB of 3GPP 5G) of the Home PLMN.

In some embodiments, the processing element may receive the list from the Home PLMN via: (a) a visited PLMN of the given country, or (b) a WiFi access point in the given country.

In some embodiments, the processing element may send a fetch request to an entitlement server while roaming in the given country, e.g., as described above in connection with FIG. 11. The fetch request may include an indication of the UE's location and an identification of the given network slice. The processing element may receive the list of one or more PLMNs after having sent the fetch request.

In some embodiments, the processing element may prioritize the one or more PLMNs of the list over preferred PLMNs (e.g., user preferred and operator preferred PLMNs), for PLMN selection.

In some embodiments, the processing element may receive an updated list of one or more PLMNs that support the given network slice in the given country, e.g., as variously described above.

In some embodiments, a method 1300 for operating an Access & Mobility Management Function (AMF) of a Home Public Land Mobile Network (PLMN) in a home country may include the operations shown in FIG. 13. (The method 1300 may also include any subset of the elements, embodiments and features described above in connection with FIGS. 1-12.) The AMF may be realized, e.g., by a processing element executing program instructions.

At 1310, the processing element may retrieve a list of one or more roaming (or visited) Public Land Mobile Networks (PLMNs) that support a given network slice in a given country, wherein the given country is different from the home country. For example, the AMF may retrieve the list from a Network Slice Selection Function (NSSF) of the Home PLMN.

At 1315, the processing element may send the list to a user equipment (UE) that is subscribed to the Home PLMN. The list may be sent to the UE via a base station (e.g., a gNB of 3GPP 5G), or via the Internet.

In some embodiments, the processing element may send the list in response to a registration request (or other message) received from the UE. The registration request (or other message) may indicate the given network slice and/or the given country. The network slice may be indicated, e.g., using a Single-Network Slice Selection Assistance Information (S-NSSAI) value.

In some embodiments, the processing element may send the list to the UE without any request being asserted by the UE for the list. (Thus, the list may be said to be pushed to the UE.) For example, the processing element may send the list to the UE while the UE is associated with (e.g., camped on or connected to) the Home PLMN.

In some embodiments, the processing element may send the list to the UE via a Visited PLMN to which the UE has attempted to register (or has connect to) in the given country.

In some embodiments, the processing element may send the list to an entitlement server of a Visited PLMN to which the UE has connected, e.g., as variously described above. The entitlement server may forward the list to the UE.

In some embodiments, the processing element may send a validity timer value to the UE along with the list, e.g., a validity timer value as described in any of the embodiments above.

Figure 14:
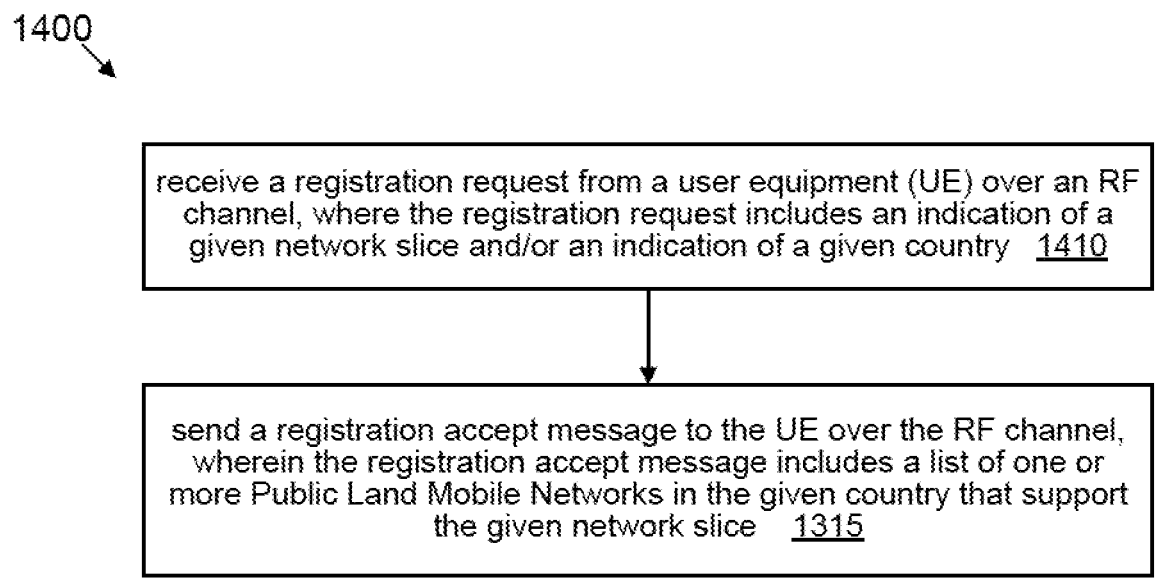
FIG. 14 illustrates a method for operating a base station, according to some embodiments.

In some embodiments, a method 1400 for operating a base station (BS) may include the operations shown in FIG. 14 (The method 1400 may also include any subset of the elements, embodiments and features described above in connection with FIGS. 1-13.) The base station may be configured as variously described above, e.g., as described in connection with base station 102 of FIG. 4. The method 1400 may be performed by a processing element of the base station.

At 1410, the processing element may receive a registration request (or other message) from a user equipment (UE) over an RF channel, where the registration request (or other message) includes an indication of a given network slice and/or an indication of a given country, e.g., as variously described above. The given network slice may be a slice that the UE is interested in using. The given country is different from a home country of the Home PLMN of the UE. The given country may be, e.g., a country in which the UE is roaming, or a country the UE anticipates it will be visiting in the future. The base station may be a base station of the Home PLMN, or a base station of a roaming PLMN in the given country.

At 1415, the processing element may send a registration accept message (or more generally, a response message) to the UE over the RF channel, wherein the registration accept message (or response message) includes a list of one or more Public Land Mobile Networks in the given country that support the given network slice.

In some embodiments, the base station may be a base station belonging to a home PLMN of the UE, e.g., as variously described above.

In some embodiments, the base station may be a base station belong to a visited PLMN in the given country, e.g., a visited PLMN to which the UE has connected or sent the registration request. The UE may switch to another PLMN of the given country after receiving the list, e.g., to a PLMN selected from the list.

In some embodiments, the processing element may send a validity timer period to along with the list, e.g., as variously described herein.

Embodiments of the present disclosure may be realized in any of various forms. For example, some embodiments may be realized as a computer-implemented method, a computer-readable memory medium, or a device. Other embodiments may be realized using one or more custom-designed hardware devices such as ASICs. Still other embodiments may be realized using one or more programmable hardware elements such as FPGAs.

Some embodiments may include a device, comprising: an antenna; a radio coupled to the antenna; and a processing element operably coupled to the radio, wherein the device is configured to implement any or all parts of the preceding examples.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Yet another exemplary embodiment may include an apparatus comprising means for performing any or all of the elements of any of the preceding examples.

Still another exemplary embodiment may include an apparatus comprising a processing element configured to cause a device to perform any or all of the elements of any of the preceding examples.

Any of the methods described herein for operating a user equipment (UE) in communication with a base station may be the basis of a corresponding method for operating a base station, by interpreting each message/signal X received by the UE in the downlink as a message/signal X transmitted by the base station, and each message/signal Y transmitted in the uplink by the UE as a message/signal Y received by the base station.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE), comprising:
   at least one antenna;
   a radio subsystem coupled to the at least one antenna; and
   a processing element coupled to the radio subsystem, wherein the processing element is configured to:
   transmit, to a home Public Land Mobile Network (PLMN) of the UE, a registration request including a requested Single-Network Slice Selection Assistance Information (S-NSSAI) value associated with a given network slice;
   receive, after having transmitted the registration request, a list of a plurality of PLMNs that support the given network slice in a given country, wherein the given country is different from a home country of the home PLMN of the UE, wherein the given network slice is supported in the home PLMN, wherein the requested S-NSSAI value includes an information element indicating whether the list of the plurality of PLMNs is requested; and
   in response to determining that the UE is located in the given country and that access to the given network slice is desired, access a PLMN of said list to use the given network slice.

2. The UE of claim 1, wherein the registration request includes:
   an identification of one or more roaming countries including the given country.

3. The UE of claim 1, wherein the list is received along with a validity timer period indicating a length of time within which said list is guaranteed to be valid.

4. The UE of claim 1, wherein the processing element is configured to receive a validity timer period that indicates a period of time after which the one or more PLMNs of the list will no longer support the given slice.

5. The UE of claim 1, wherein the processing element is configured to receive the list: (a) when the UE is associated with the Home PLMN in the home country; and (b) without any request asserted by the UE for the list.

6. The UE of claim 1, wherein the processing element is configured to receive the list from the Home PLMN via:
   (a) a visited PLMN of the given country, or
   (b) a WiFi access point in the given country; or
   (c) satellite based Internet connectivity in the given country.

7. The UE of claim 1, wherein the processing element is configured to:
   send a fetch request to an entitlement server while roaming in the given country, wherein the fetch request includes an indication of the UE's location and an identification of the given network slice, wherein said list is received after having sent the fetch request.

8. The UE of claim 1, wherein the processing element is configured to prioritize the one or more PLMNs of the list over user preferred and operator preferred PLMNs, for PLMN selection.

9. The UE of claim 1, wherein the processing element is configured to receive an updated list of one or more PLMNs that support the given network slice in the given country.

10. A method for operating a user equipment (UE), the method comprising:
    transmitting, to a home Public Land Mobile Network (PLMN), a registration request including a requested Single-Network Slice Selection Assistance Information (S-NSSAI) value associated with a given network slice;
    receiving, after having transmitted the registration request, a list of a plurality of PLMNs that support the given network slice in a given country, wherein the given country is different from a home country of the home PLMN of the UE, wherein the given network slice is supported in the home PLMN, wherein the requested S-NSSAI value includes an information element indicating whether the list of the plurality of PLMNs is requested; and
    in response to determining that the UE is located in the given country and that access to the given network slice is desired, accessing a PLMN of said list, to use the given network slice.

11. The method of claim 10, wherein the registration request includes:
    an identification of one or more roaming countries including the given country.

12. The method of claim 10, wherein the list is received from the Home PLMN of the UE: (a) while the UE is camped on the Home PLMN in the home country, and (b) without any request asserted by the UE for the list.

13. The method of claim 10, further comprising:
sending a fetch request to an entitlement server while roaming in the given country, wherein the fetch request includes an indication of the UE's location and an identification of the given network slice, wherein said list is received after having sent the fetch request.

14. A non-transitory memory medium storing program instructions, wherein the program instructions, when executed by a processing element, cause a user equipment (UE) to implement:
transmitting, to a home Public Land Mobile Networks (PLMN), a registration request including a requested Single-Network Slice Selection Assistance Information (S-NSSAI) value associated with a given network slice;
receiving, after having transmitted the registration request, a list of a plurality of PLMNs that support the given network slice in a given country, wherein the given country is different from a home country of the home PLMN of the UE, wherein the given network slice is supported in the home PLMN, wherein the requested S-NSSAI value includes an information element indicating whether the list of the plurality of PLMNs is requested; and
in response to determining that the UE is located in the given country and that access to the given network slice is desired, accessing a PLMN of said list to use the given network slice.

15. The non-transitory memory medium of claim 14, wherein the registration request includes:
an identification of one or more roaming countries including the given country.

16. The non-transitory memory medium of claim 14, wherein the list is received from the Home PLMN of the UE: (a) while the UE is camped on the Home PLMN in the home country, and (b) without any request asserted by the UE for the list.

17. The non-transitory memory medium of claim 14, wherein the program instructions, when executed by the processing element, cause the UE to implement:
sending a fetch request to an entitlement server while roaming in the given country, wherein the fetch request includes an indication of the UE's location and an identification of the given network slice, wherein said list is received after having sent the fetch request.

* * * * *